Dec. 8, 1953     A. H. STANLEY ET AL     2,661,856
DOLLY FOR SUPPORTING TRACTOR FRONT WHEELS
Filed July 28, 1951     2 Sheets—Sheet 1
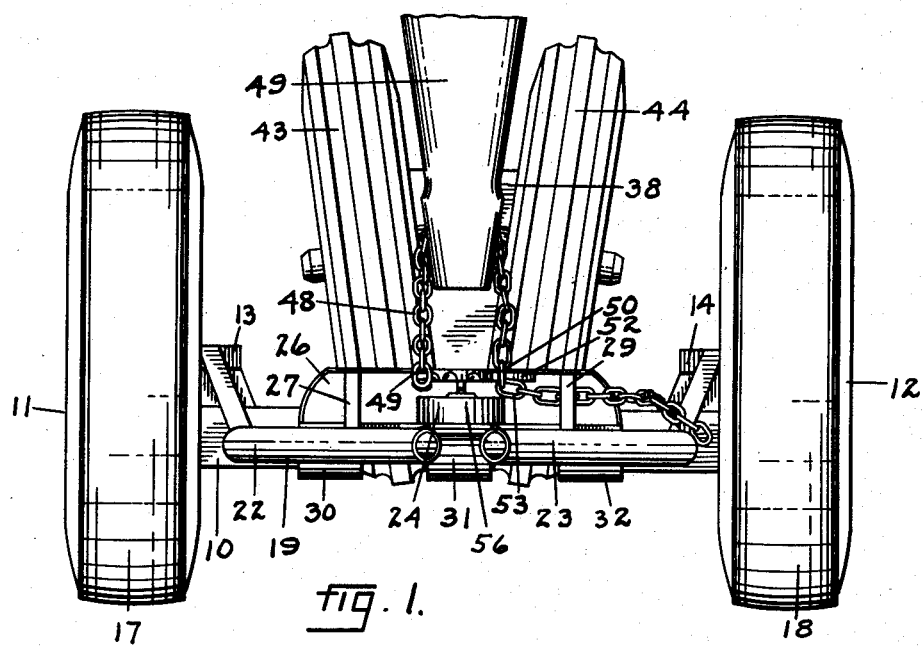
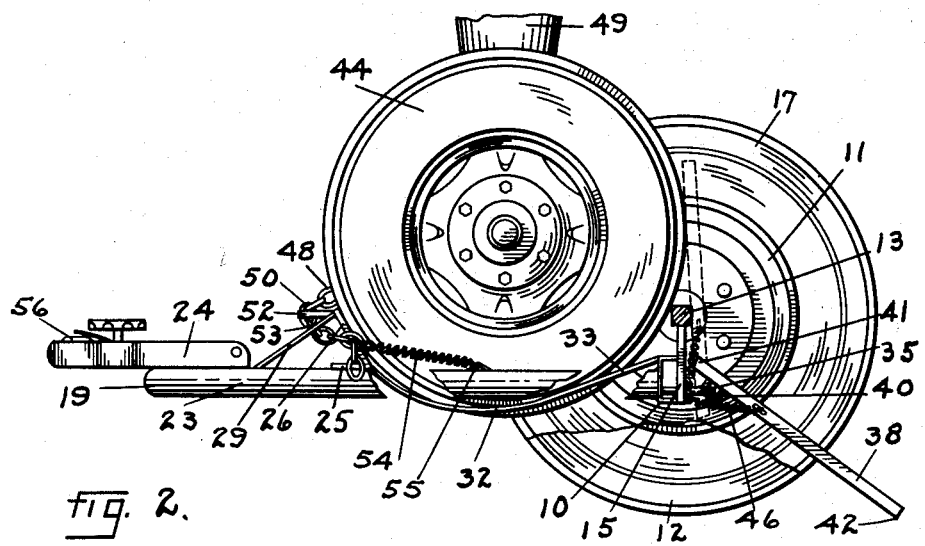
INVENTORS,
AUBREY H. STANLEY,
LYMAN E. MAYNARD,
By Herbert A. Minturn,
ATTORNEY.

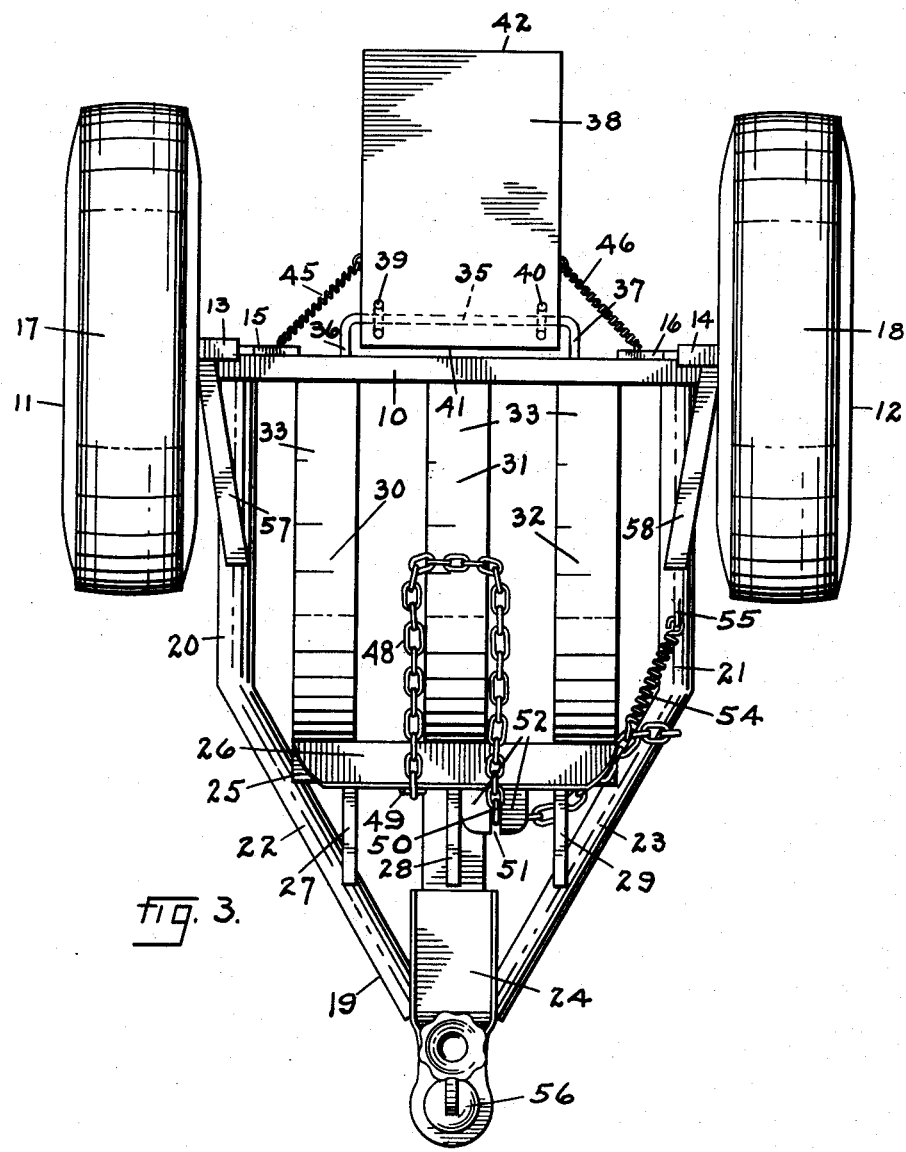

Patented Dec. 8, 1953

2,661,856

UNITED STATES PATENT OFFICE 2,661,856

DOLLY FOR SUPPORTING TRACTOR FRONT WHEELS

Aubrey H. Stanley, Clayton, and Lyman E. Maynard, Plainfield, Ind.

Application July 28, 1951, Serial No. 239,131

3 Claims. (Cl. 214—334)

This invention relates to a device which may be coupled to the back end of a truck for the purpose of pulling a tricycle type tractor. It frequently happens that a tractor of this type is desired to be taken to some remote place, and then the operator desires to leave the tractor and return to the point of starting. Heretofore it has been required that an operator drive the tractor itself on the road, and a second person follow up with some conveyance such as a truck in order to bring back the operator.

By use of the invention herein shown and described, one person can deliver the tractor and return. Moreover, the tractor itself is not being driven under its own power while being conveyed along the road. Another occasion for use of the invention is when the tractor itself is broken down and needs to be pulled into a shop for repairs, and while it may be driven for a short distance, it would be unsafe to drive the entire distance.

In any event, the invention provides a structure upon which the front wheel or wheels of the tractor may be driven, the front end of the tractor then secured in position, and the truck driven off with the tractor being towed therebehind, the tractor riding on the road by its two rear wheels only. The object of the invention is to provide a structure which will permit this operation, without any necessity of having to jack up the front end of the tractor, to load it or unload it. A further object of the invention is to permit the towing of the tractor under any and all conditions wherein a truck may be operated without having to have an operator on the tractor itself. A further important object of the invention is to provide means for securing the front end of the tractor in a relatively fixed manner on the device so that the entire towing operation may be conducted without any danger of the tractor becoming disengaged.

These and other objects and advantages of the invention including the extreme simplicity and relatively low cost of the structure embodying the invention will become apparent to those versed in the art in the following description of one particular form of the invention, which is made in reference to the accompanying drawings, in which Fig. 1 is a view in front elevation of a structure embodying the invention and illustrating the front wheels of the tractor mounted thereon;

Fig. 2 is a view in side elevation in partial section of the structure; and

Fig. 3 is a view in top plan of the structure.

In the particular form of the invention herein shown, there is employed a drop axle 10, to which are attached the wheels 11 and 12 through stub axles 13 and 14 positioned above the axle 10 by any suitable means, herein shown as by the plates 15 and 16 secured to the axle 10 proper. This particular construction permits the axle 10 to be swung between the wheels 11 and 12 below the horizontal axis through the axles 13 and 14 so as to bring the axle 10 nearer to the ground than is the axis through the members 13 and 14. Preferably the wheels 11 and 12 are provided with pneumatic tires 17 and 18 to provide a resiliency to the structure as it is pulled over the ground or road.

A frame generally indicated by the numeral 19 is of a Y shape to have rearwardly turned arms 20 and 21 secured to the axle 10, and from the forward ends of which arms 20 and 21 there extend the members 22 and 23 to turn diagonally inwardly one toward the other to have the forward ends fixed on a drawbar member 24. The frame member 19, for the purpose of being as light as possible with the maximum strength, is shown as being made out of a tubular material.

Across the members 22 and 23 there is fixed a plate 25, from the rear edge of which there is turned upwardly and forwardly a plate 26 to serve as a wheel chock. The plate 26 is braced by any suitable means, herein shown as by the three braces 27, 28, and 29 extending from near the upper forward edge of the plate 26 downwardly to the frame members 22 and 23 and the draw bar 24 in the center therebetween.

Between the lower rear edge of the plate 26 and the upper edge of the axle 10, there are fixed a plurality of floor members, herein shown as three in number and designated by the numerals 30, 31, and 32. These members are spaced apart as indicated in Fig. 3, to have the outer members 30 and 32 attached to the outermost end portions of the plate 26, and the member 31 centrally positioned therebetween to leave open spaces between the respective members. These members 30, 31, and 32 extend rearwardly in a parallel arrangement, and are curved particularly at their forward end portions in an arcuate manner to extend downwardly from the lower edge portion of the plate 26, and thence around and upwardly, rearwardly into substantially straight lenght portions 33 in each instance. In other words, the members 30, 31, and 32 reach their lowest elevations immediately rearwardly of the plate 26, this lowest elevation in each instance being slightly below the underside of the frame 19.

On the rear side of the axle 10, there is mounted centrally of the length thereof a bar 35 which extends in parallel relation to the axle 10, but is spaced rearwardly therefrom by the forwardly turned end legs 36 and 37 which unite by their forward ends with the axle 10. A ramp 38 is hinged to the bar 35 by any suitable means, herein shown as by U members 39 and 40 which surround the bar 35 and engage with the ramp 38. The members 39 and 40 are located rearwardly of the forward edge 41 of the ramp so that the upper edge 41 may be substantially at the top level of the axle 10 when the other end 42 of the ramp 38 is resting on the ground. The lengths of the bar rod ends 36 and 37 are made to be such that the end 41 of the ramp is so spaced that the ramp 38 may be lifted from its down position to some upper position as indicated by the dash lines in Fig. 2 so that the end 41 may swing around between the bar 35 and the axle 10 without interference.

It is desirable that the ramp 38 be yieldingly maintained in the position as indicated in Fig. 2, when the wheels 43, 44 on tractor are driven thereup to come over the floor members 30, 31, 32.

To yieldingly retain the ramp 38 in its lowered position, one or more springs, herein shown as two in number and designated by the numerals 45 and 46, are secured by forward ends to the back lower portion of the axle 10 and by rear ends to the ramp 38. The springs 45 and 46, when the ramp 38 is lowered, extend below the bar 35 so that they tend to pull the ramp end 42 downwardly.

With the ramp 38 in this lowered position, the tractor (not shown) has its front wheels 43, 44 driven up the ramp 38, and then onto the members 30, 31, 32 to bring the wheels against the chock plate 26 as indicated in Figs. 1 and 2. The shapes of the members 30, 31, and 32 are such that the wheels 43, 44 will automatically be carried against the plate 26. Also it is to be noted that the spacing apart of these members 30, 31, 32 is such that the central portions of the tires or wheels 43, 44 will come therebetween as indicated in Fig. 1 so that there is no tendency for the wheels 43, 44 to slip laterally across these members 30, 31, 32 by reason of the projection of the tread therebetween. However, the spacing is such that there is ample support of the wheels 43, 44 on each side of the central areas thereof.

When the wheels 43, 44 are driven up the ramp 38, they will tend to push downwardly on the forward edge 41 of the ramp 38 tending to lift the rear edge 42 of the ramp 38 upwardly. This ramp 38 if it is not pressed downwardly sufficiently by the front edge 41 can be given a further upward lift by hand, and as soon as the springs 45 and 46 are carried by their rear end portions above the bar 35, those springs will cause the ramp 38 to assume an upwardly directed position such as is indicated by the dash lines in Fig. 2, the forward travel of the ramp 38 then being limited by coming into contact with the rear sides of the wheels 43, 44. Thus the ramp 38 is brought up out of contact with the ground, and is automatically carried in an upwardly extending position.

In order to secure the wheels 43, 44 securely in position when they are brought up against the chock plate 26, there is provided a securing means, herein shown as consisting of a length of chain 48 which has a link 49 thereof at one end welded or otherwise secured to the front upper portion of the plate 26. The chain 48 has in length sufficient for it to be carried upwardly and rearwardly around the front post 49 of the tractor which is positioned between the wheels 43 and 44, and then down and forwardly again over the plate 26 to have a link 50 extend downwardly through the slot 51 of the forwardly extending plate 52 secured to the chock plate 26. The next following link 53 is turned crosswise under the plate 52 to prevent upward withdrawal of the link 50, and that link 50 is maintained in position by carrying the free end of the chain 48 outwardly to one side to have a spring 54 hooked into that chain by one end and the other end engaged to a lug 55 carried by the frame member 21 so that the free end of the chain is normally held under tension. The chain 48 is employed to prevent the bouncing of the wheels 43, 44 on the members 30, 31, 32 to prevent displacement of those wheels in reference to those members.

The drawbar 24 has a coupling head 56 which may be used in the well known and usual manner to interconnect the frame 19 to a truck or other motive device (not shown). Preferably the axle members 13 and 14 are braced in any suitable manner, such as by the forwardly and downwardly extending braces 57 and 58 bearing by their front ends against the frame members 20 and 21.

When the tractor has been taken to the desired location, the engine thereof is started, and the tractor is backed after the chain 48 has been released from around the post 49 to pull the wheels 43, 44 up out of the pocket provided on the members 30, 31, 32 back of the chock 26, so as to bring the wheels up over the axle 10, and then down the ramp 38. The ramp 38 would normally be pulled around and lowered to the ground, although if that operation is forgotten, then the wheels 33, 34 will automatically push the ramp 38 down to the inclined position. It is to be understood of course that when the tractor is being transported by having the wheels 43, 44 on the device, the tractor is out of gear and the main drive wheels are free to turn without turning the engine of the tractor.

Therefore it is to be seen that we have provided a very simple but most effective structure for the purposes intended, and while the structure has been described in the one particular form in detail, it is obvious that structural changes may be made without departing from the spirit of the invention, and we therefore do not desire to be limited to that precise structure beyond the limitations which may be imposed by the following claims.

We claim:

1. A tricycle tractor hauler for supporting and drawing a tractor by its front wheels with the rear wheels riding on the ground, comprising a pair of wheels; a drop center axle between the wheels; a frame extending forwardly of the axle; a tractor wheel chock bar fixed to and across a forward portion of said frame; a tractor front wheel basket fixed to said axle and extending forwardly and fixed to said bar, the basket having a depressed portion therein; said basket having a longitudinally slotted floor, within the slots of which the treads of said front wheels may partially protrude; and means holding said front wheels in said tread protrusion position against lifting from said floor to maintain the wheels against lateral movement across said floor.

2. For a tricycle type tractor, a transporting unit to hold the tractor front, tired wheels above the ground, comprising a pair of wheels; a rigid axle on which said wheels are revolubly mounted in fixed alignment; a wishbone frame of side members merging forwardly and centrally of said axle into a tongue, the rear ends of said members being fixed to said axle respectively adjacent said wheels; a member carried by and extending transversely across said frame spaced forwardly a distance from said axle; a plurality of spaced apart slats supported by and extending forwardly, downwardly and thence upwardly from said axle to said member having their forward ends carried thereby, forming a tractor front wheel receiving slot on each side of a central slat, the widths of said slots being less than the cross-section diameter of the tires of said tractor wheels.

3. For a tricycle type tractor, a transporting unit to hold the tractor front, tired wheels above the ground, comprising a pair of wheels; a rigid axle on which said wheels are revolubly mounted in fixed alignment; a wishbone frame of side members merging forwardly and centrally of said axle into a tongue, the rear ends of said members being fixed to said axle respectively adjacent said wheels; a plurality of spaced apart slats extending forwardly, downwardly and thence upwardly from said axle into the apex of said frame, forming a tractor front wheel receiving slot on each side of a central slat, the widths of said slats being less than the cross-section diameter of the tires of said tractor wheels; a bar extending laterally across and above the merging forward end portion of said side members; said slats having their front ends carried by said bar to have the bar extend thereabove as a forward stop for said tractor wheels; said axle having a dropped central portion from which said slats extend; a ramp hinged to said axle central portion; and off-center spring means retaining said ramp selectively in elevated and dropped positions.

AUBREY H. STANLEY.
LYMAN E. MAYNARD.

References Cited in the file of this patent
UNITED STATES PATENTS

| Number | Name | Date |
|---|---|---|
| 1,824,370 | Reid | Sept. 22, 1931 |
| 2,350,118 | Knapp | May 30, 1944 |
| 2,541,582 | Hawkins | Feb. 13, 1951 |